US012276244B2

(12) United States Patent
Benson et al.

(10) Patent No.: US 12,276,244 B2

(45) Date of Patent: Apr. 15, 2025

(54) FUEL INJECTORS WITH MISALIGNMENT COMPENSATION

(71) Applicant: CUMMINS-SCANIA HPCR SYSTEM, LLC, Columbus, IN (US)

(72) Inventors: Donald J. Benson, Columbus, IN (US); Tamas Rauznitz, Columbus, IN (US); Ahmad M. Sabri, Columbus, IN (US); Hanumantharao Konakanchi, Columbus, IN (US); David Benson, Columbus, IN (US)

(73) Assignee: Cummins-Scania HPCR System, LLC, Columbus, IN (US)

( * ) Notice: Subject to any disclaimer, the term of this patent is extended or adjusted under 35 U.S.C. 154(b) by 0 days.

(21) Appl. No.: 18/563,332

(22) PCT Filed: Jun. 7, 2022

(86) PCT No.: PCT/US2022/032499

§ 371 (c)(1),
(2) Date: Nov. 21, 2023

(87) PCT Pub. No.: WO2022/261093

PCT Pub. Date: Dec. 15, 2022

(65) Prior Publication Data

US 2024/0229752 A1 Jul. 11, 2024

Related U.S. Application Data

(60) Provisional application No. 63/208,745, filed on Jun. 9, 2021.

(51) Int. Cl.
*F02M 61/16* (2006.01)

(52) U.S. Cl.
CPC ....... *F02M 61/168* (2013.01); *F02M 2200/16* (2013.01)

(58) Field of Classification Search
CPC ............... F02M 61/18; F02M 61/1806; F02M 61/1846; F02M 61/1853; F02M 61/188;
(Continued)

(56) References Cited

U.S. PATENT DOCUMENTS 5,383,607 A 1/1995 Heyse et al.
5,699,995 A 12/1997 Robertson
(Continued)

FOREIGN PATENT DOCUMENTS

JP 2001-012333 A 1/2001

OTHER PUBLICATIONS

International Search Report and Written Opinion for PCT Application No. PCT/US2022/032499, dated Oct. 28, 2022.

*Primary Examiner* — Grant Moubry
(74) *Attorney, Agent, or Firm* — Foley & Lardner LLP

(57) ABSTRACT

A fuel injector assembly including a member and a seat. The member has a first center along a longitudinal axis. The member has a curved surface and a flat surface. The curved surface has a radius of curvature greater than a width of the member. The flat surface is axially opposed to the curved surface. The seat has a second center disposed on the longitudinal axis. The seat is positioned distal from the flat surface defining a flow path in an open position of the fuel injector assembly and is in confronting relation to the flat surface such that the second center is concentric to the first center forming a sealing interface in a closed position of the fuel injector assembly.

15 Claims, 8 Drawing Sheets

(58) Field of Classification Search
CPC ...... F02M 61/12; F02M 61/14; F02M 61/162; F02M 61/168; F02M 51/06; F02M 51/0621
See application file for complete search history.

(56) References Cited

U.S. PATENT DOCUMENTS

| | | | | |
|---|---|---|---|---|
| 5,954,312 | A | 9/1999 | Earnhardt | |
| 6,021,963 | A | 2/2000 | Coldren et al. | |
| 6,227,457 | B1 * | 5/2001 | Oliver | F02M 51/0625 239/585.1 |
| 8,573,186 | B2 | 11/2013 | Rettich et al. | |
| 2002/0030123 | A1 | 3/2002 | Haltiner et al. | |
| 2005/0077395 | A1 * | 4/2005 | Michioka | F02M 51/0671 239/585.5 |
| 2005/0087626 | A1 | 4/2005 | Sayar | |
| 2009/0090794 | A1 | 4/2009 | Hung et al. | |
| 2011/0232606 | A1 * | 9/2011 | Peters | F02M 45/12 123/472 |
| 2012/0037124 | A1 * | 2/2012 | Peters | F02M 61/14 123/470 |
| 2012/0103308 | A1 | 5/2012 | Hefler et al. | |
| 2016/0177900 | A1 * | 6/2016 | Benson | F02M 47/027 239/127 |

* cited by examiner

FUEL INJECTORS WITH MISALIGNMENT COMPENSATION

CROSS-REFERENCE TO RELATED PATENT APPLICATIONS

This application is the U.S. National Phase of PCT Application No. PCT/US2022/032499, filed Jun. 7, 2022, which claims the benefit of and priority to U.S. Provisional Patent Application No. 63/208,745 filed Jun. 9, 2021, the contents of which are-incorporated by reference herein in their entirety.

TECHNICAL FIELD

The present disclosure relates generally to fuel injectors for use in internal combustion engine systems.

BACKGROUND

In an effort to reduce nitrogen oxide (NOx) and greenhouse gas emissions, emission regulations have become more stringent over recent years. In engines, increasing efficiency is one approach to reducing harmful emissions. However, the high operative rate of engines results in subsystems, such as fuel injectors, that can leak fuel due to the improper sealing as a result of components being misaligned after cyclically completing injection events over an extended period of time. Fuel leaking from the subsystems can result in decreased engine efficiency.

SUMMARY

One embodiment relates to a fuel injector assembly including a member and a seat. The member has a first center along a longitudinal axis. The member has a curved surface and a flat surface. The curved surface has a radius of curvature greater than a width of the member. The flat surface is axially opposed to the curved surface. The seat has a second center disposed on the longitudinal axis. The seat is positioned distal from the flat surface defining a flow path in an open position of the fuel injector assembly and is in confronting relation to the flat surface such that the second center is concentric to the first center forming a sealing interface in a closed position of the fuel injector assembly.

Another embodiment relates to a seat for a fuel injector assembly configured to interface with a sealing member. The seat includes a fuel inlet, a raised perimeter positioned along the fuel inlet, and a plurality of raised features positioned radially away from the raised perimeter. Each of the plurality of raised features includes a plurality of raised pads that increase in width circumferentially relative to the raised perimeter as each of the plurality of raised pads radially extends away from the raised perimeter.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
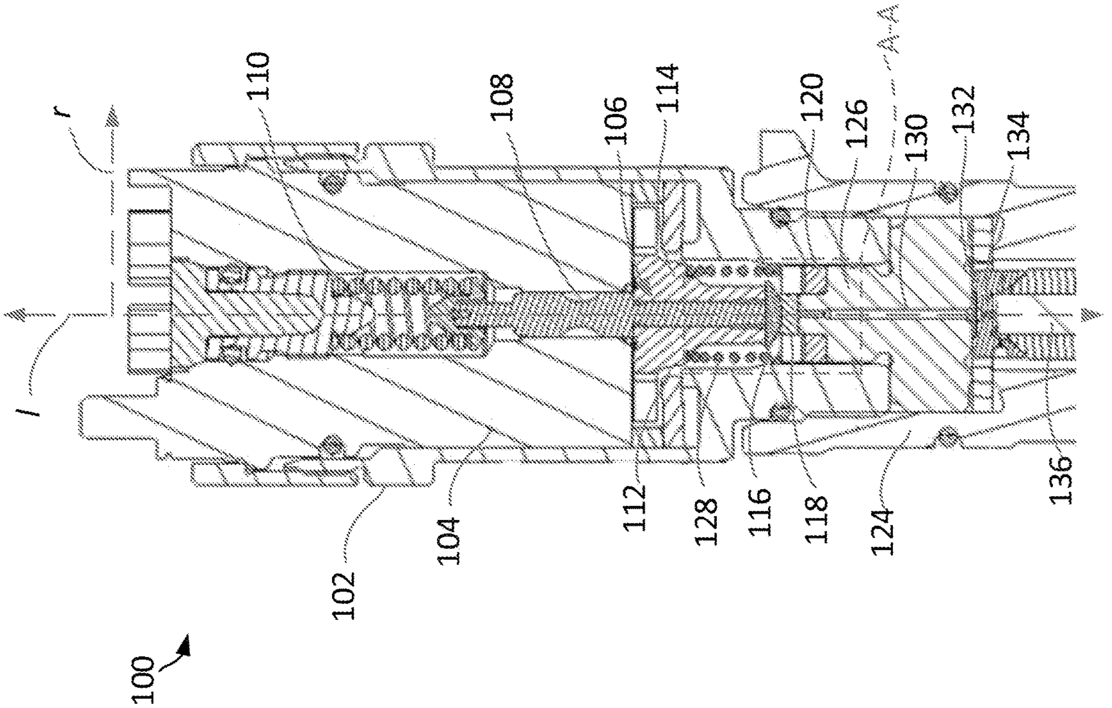
FIG. 1 is a cross-sectional schematic of an example fuel injector assembly.

It will be recognized that the figures are schematic representations for purposes of illustration. The figures are provided for the purpose of illustrating one or more implementations with the explicit understanding that the figures will not be used to limit the scope or the meaning of the claims.

DETAILED DESCRIPTION

Following below are more detailed descriptions of various concepts related to, and implementations of, methods, apparatuses, and systems for a fuel injector compensating for misalignment. The methods, apparatuses, and systems introduced above and discussed in greater detail below may be implemented in various ways, as the described concepts are not limited to any particular manner of implementation. Examples of specific implementations and applications are provided primarily for illustrative purposes.

I. Overview

Implementations herein are related to a fuel injector assembly that injects high-pressure fuel into a combustion chamber of an engine assembly for a specified period of time. The fuel injector assembly prevents or minimizes improper sealing, which may occur as a result of components being misaligned after cyclically completing injection events over an extended period of time. One form of such misalignment is radial misalignment of the components at a sealing interface of the fuel injector assembly. The components at the sealing interface may include a first member, such a spherical element having a flat surface proximate to a seat. During an injection event, the fuel injector assembly provides radial guidance to the spherical element by a second member that is in confronting relation to the seat. The second member contains and guides the spherical element. This may assist the spherical element to be radially aligned to the seat at the sealing interface.

The fuel injector assembly may prevent or minimize wear at the interface between the spherical element and the second member. This wear may be due to sliding motions by the spherical element, as the spherical element rotates to address angular misalignment, which may result in undesirable axial stroke changes of the moving elements of the fuel injector assembly. Deformation, which may occur at the interface between the first member and the second member, is minimized via a large radius of curvature of the spherical element. This may also reduce a localized stress between the surfaces of the spherical element that make contact with the second member (e.g., when the second member is distal to the seat). It may be desirable to reduce the localized stress in this region as it may result in plastic deformation due to the high-volumetric nature (e.g., potentially exceeding a billion operational cycles) of the fuel injector assembly. This plastic deformation may result in decreased performance of the fuel injector assembly.

The fuel injector assembly may prevent or reduce damage that can occur at central sealing sections and at outer raised regions of the seat as a result of high-impact forces by compensating for angular misalignment caused when the injection event is ended. These high-impact forces may result in coating loss at the central sealing sections and at the outer raised regions due to delamination and wear. The angular misalignment, which would result in a small moment (e.g., a turning effect caused by the high-impact forces, a lever action across the length of the lever arm, etc.) at the spherical element, may be partially compensated for by the large radius of curvature of the spherical element. The maximum length of the moment (e.g., the lever arm, etc.) is the radius of the flat surface of the spherical element. This radius is defined by the geometric packaging constraints of the injector and the second member, in which the spherical element is contained.

The fuel injector assembly, according to various embodiments, also addresses the dissipation of kinetic energy of the moving elements within the fuel injector assembly. This may reduce a decrease in performance for the fuel injector assembly and the wide variability in the quantity of injected fuel in closely coupled multi-pulse injection events. Additionally, the fuel assembly may include features to improve the robustness of the outer raised regions of the seat at the sealing interface to improve durability against hard debris.

Additionally, the fuel injector assembly may include features to improve an assembly process during initial production, during servicing, or rebuilding, which may be negatively affected by the small sizes of members (e.g., such as the spherical element having a flat side, etc.). Assembling and orienting the small sized members relative to other members (e.g., relative to a seat, etc.) may be difficult and costly.

II. Overview of Fuel Injector Assembly

FIG. 1 is a cross-sectional schematic of an example fuel injector assembly 100. The fuel injector assembly 100 contains high-pressure fuel to be injected into a combustion chamber of an engine assembly for a specified period of time (e.g., an injection event). As discussed in greater detail herein, the structure of the fuel injector assembly 100 according to various embodiments may promote improved sealing performance at sealing interfaces for improved engine efficiency. The structure of the fuel injector assembly 100 can achieve these benefits by compensating for angular and radial misalignment. The structure of the fuel injector assembly 100 may also improve the durability of these sealing interfaces and reduce the magnitude of the deformation at the sealing interface surfaces during operation of the fuel injector assembly 100. The structure of the fuel injector assembly 100 may also reduce the coating loss as a result of reduced delamination and/or wear. The fuel injector assembly 100 also can have improved durability and robustness at the sealing interface from hard debris. The fuel injector assembly 100 can also improve the ease of assembly of its components, and can improve the multi-pulse injection performance of the fuel injector assembly 100.

The fuel injector assembly 100 includes a seat 126 (e.g., surface, datum, etc.) and an armature assembly 106. The armature assembly 106 includes a member in the form of a sealing member, e.g., disc 118 (e.g., planar component, surface, cover, etc.). The disc 118 has a first center 119 along a longitudinal axis l. The seat 126 has a second center 127 disposed on the longitudinal axis l.

The fuel injector assembly 100 can also include an upper housing 102 (e.g., casing, body, etc.) and a stator 104 (e.g., static rotor). The stator 104 is positioned in the upper housing 102 proximate to an inner surface of the upper housing 102 (e.g., an inner perimeter of the upper housing 102). The stator 104 is a static component that is configured to provide an electromagnetic force. The fuel injector assembly 100 is electronically coupled to an electric power source. The electric power source is controlled by a controller (e.g., an engine control module (ECU)). The fuel injector assembly 100 provides electrical power to the stator 104 via the controller.

The longitudinal axis l extends along a length of the fuel injector assembly 100. The longitudinal axis l is positioned along a radial center point of the fuel injector assembly 100. The fuel injector assembly 100 further defines a radial axis r that is perpendicular to longitudinal axis l along the length of longitudinal axis l.

The armature assembly 106 is centered on the upper housing 102 and extends along the longitudinal axis l within the upper housing 102. The armature assembly 106 is configured to translate along longitudinal axis l when exposed to the electromagnetic force generated by the stator 104.

The armature assembly 106 includes an armature plunger 108 (e.g., extension, rod, etc.). The armature plunger 108 is positioned at a first end of the armature assembly 106. The armature plunger 108 is further positioned in a bore, e.g., a central bore defined by the stator 104 and located along the longitudinal axis l. When the armature assembly 106 translates along longitudinal axis l, the armature plunger 108 also translates along longitudinal axis l and is guided by the central bore of the stator 104. Within the central bore of the stator 104, the armature plunger 108 is able to radially translate and/or tilt (e.g., define an angle relative to the radial axis r) within the central bore when the armature assembly 106 is at rest or during longitudinal translation. In some embodiments, the fuel injector assembly 100 may not include the stator 104, a central bore, or the components of the armature assembly 106. In some embodiments, the fuel injector assembly 100 may utilize a piezoelectric element and may not include a stator, a central bore, or an armature.

The fuel injector assembly 100 further includes a primary biasing member 110, for example in a form of a coil spring. The primary biasing member 110 is positioned within the central bore of the stator 104 and on a first end of the armature plunger 108. The primary biasing member 110 places a biasing force onto the armature plunger 108 thereby biasing the armature assembly 106 to a normally closed position. In the closed position, the fuel injector assembly 100 does not inject high-pressure fuel. When the stator 104 generates an electromagnetic force, the armature assembly 106 is magnetically attracted to the stator 104. When the electromagnetic force provided by the stator 104 exceeds the biasing force provided by the primary biasing member 110, the armature assembly 106 is lifted (e.g., longitudinally translates), resulting in an open position. In the open position, the fuel injector assembly 100 injects high-pressure fuel into a combustion chamber for the initiation of an injection event.

After a desired amount of high-pressure fuel is injected into the combustion chamber, the fuel injector assembly 100 returns to a closed state. To return to the closed state, the fuel injector assembly 100 stops providing power to the stator 104, which causes the stator 104 to no longer generate the electromagnetic force. This causes the biasing force by the primary biasing member 110 on the armature assembly 106 to exceed the electromagnetic force on the armature assembly 106. These net forces result in the armature assembly 106 to return to the closed position.

The fuel injector assembly 100 further includes a fuel cavity 112 (e.g., enclosure, space). The fuel cavity 112 is fluidly coupled to a low-pressure drain circuit (not shown) to which the fuel flows through the armature assembly 106 in the open state. The fuel injector assembly 100 is configured to store high-pressure fuel that is to be injected by the fuel injector assembly 100. As discussed in greater detail herein, when the fuel injector assembly 100 is the open state, the fuel cavity 112 receives high-pressure fuel from a fuel inlet 132 via a flow passage 130.

The armature assembly 106 further includes an armature 114. The armature 114 comprises a magnetic material (e.g., iron, steel, cobalt, etc.) such that when the stator 104 provides the electromagnetic force, the electromagnetic force is directly applied to the armature 114. This causes the armature 114 to be magnetically attracted to the stator 104, which results in the longitudinal translation of the armature assembly towards the stator 104. The armature 114 defines a central aperture in which the armature plunger 108 extends through.

The armature assembly 106 further includes a cap 116 (e.g., a cover, lid, top, etc.). The cap 116 is coupled to a second end of the armature plunger 108. The cap 116 defines a first profile. In example embodiments, the first profile of the cap 116 includes a convex profile (e.g., protuberant surface, etc.).

The disc 118 defines a second profile. In example embodiments, the second profile of the disc 118 includes a concave profile (e.g., depressed surface, recessed surface, etc.) that is in confronting relation (e.g., abuts, is in contact with, etc.) with the convex profile of the first profile of the cap 116. In some embodiments, the disc 118 is coupled to the cap 116. The radius of the convex profile of the first profile of the cap 116 may be slightly smaller than the spherical radius of the concave profile of the second profile of the disc 118. Accordingly, the radial position of the cap 116 may be controlled by the disc 118. This may be advantageous as it can reduce deformation caused by sliding wear (e.g., tangential stresses over time) by providing the cap 116 and the disc 118 rolling slack (e.g., free radial translation). This also mitigates coating loss on the disc 118 and the cap 116, as well as the remaining components of the fuel injector assembly 100. Additionally, this configuration may improve the durability of the fuel injector assembly 100 by reducing the contact stress magnitudes between the disc 118 and the cap 116, which in turn may reduce the contact stress magnitudes along the entire fuel injector assembly 100.

In example embodiments, the interface between the cap 116 and the disc 118 define complementary, spherical profiles that co-operate such that the first profile of the cap 116 receives the second profile of the disc 118 and the second profile of the disc 118 receives the first profile of the cap 116 when the first profile of the cap 116 receives the second profile of the disc 118. For example, the first profile of the cap 116 may include a concave profile and the second profile of the disc 118 may include a convex profile. Due to the complementary, spherical profiles of the cap 116 and the disc 118 (e.g., the first profile of the cap 116 and the second profile of the disc 118), radial misalignment of the cap 116 (e.g., the cap 116 not being centered on the longitudinal axis l) does not inhibit (e.g., hinder, obstruct, slow, etc.) the longitudinal translation at the interface between the cap 116 and the disc 118. The first profile of the cap 116 allows the disc 118 to roll off of (e.g., translate in a radial direction relative to) the second profile of the disc 118 to compensate for angular misalignment (e.g., to define an angle relative to radial axis r, translation at an angle) of the disc 118, when the armature assembly 106 longitudinally translates.

As discussed in greater detail below, the disc 118 is configured to prevent the high-pressure fuel from flowing from the flow passage 130 to the fuel cavity 112 when the fuel injector assembly 100 is in the closed position. When the armature assembly 106 longitudinally translates towards the stator 104, the biasing force acting to seal the high-pressure fluid at the interface between the disc 118 and a seat is removed. High-pressure fuel in the flow passage 130 acts to cause the disc 118 and the cap 116 to translate with the armature assembly 106 and the armature plunger 108. This results in the disc 118 no longer sealing the high-pressure fuel and defining a flow path for the high-pressure fuel to flow between the flow passage 130 and the fuel cavity 112.

The fuel injector assembly 100 further includes a member guide, e.g. a disc guide 120. The disc guide 120 provides a travel path for the disc 118 when the disc 118 longitudinally translates. The disc guide 120 is configured to limit the radial clearance for the disc 118 to mitigate radial translation and/or the angle of the disc 118 relative to the radial axis r. By mitigating the radial translation and/or the angle of the disc 118 relative to the radial axis r, the fuel injector assembly 100 is able to compensate for any misalignment of the armature assembly 106. This may be beneficial as it can improve the sealing performance by the disc 118. The radial clearance is further configured to provide enough radial clearance for the disc 118 to longitudinally translate smoothly through the disc guide 120.

The fuel injector assembly 100 further includes a lower housing 124 (e.g., casing, body, etc.). The lower housing 124 is coupled to the upper housing 102 and a portion of the upper housing 102 extends through a central bore of the lower housing 124. In some embodiments, the lower housing 124 is integrated into the upper housing 102.

The seat 126 is located in the lower housing 124 and is positioned in a central bore defined by the upper housing 102 and the lower housing 124. The seat 126 is in confronting relationship with the disc 118 to create (e.g., form, etc.) the sealing interface for the high-pressure fuel in the closed position. When transitioning into the open position, the armature assembly 106 lifts from the seat 126. The seat 126 defines the second center 127 that is concentric to the first center 119 of the disc 118 when the seat 126 is aligned and in confronting relationship with the disc 118 (e.g., in the closed position). The first center 119 and the second center 127 are located along (e.g., disposed on) the longitudinal axis l.

When a surface of the disc 118 is in confronting relationship to the seat 126, the surface may have a positive, a neutral, or a negative radius of curvature relative to the seat 126. In some embodiments, a surface of the seat 126 opposing the disc 118 may define a flat profile. In other embodiments, the surface of the seat 126 opposing the disc 118 may define a tapered profile such that as the radial distance of the seat 126 increases (along a centerline of the seat 126), the longitudinal distance increases between the surface and the opposing distance of the disc 118.

An absolute value of the radius of curvature for the surface of the disc 118 may be greater than a value of the radial diameter (e.g., width) of the disc 118.

The disc guide 120 cooperates with the disc 118 and the cap 116 to compensate for both radial and angular misalignment at the sealing interface. The radial misalignment is compensated by the radial guidance of the disc 118 by the disc guide 120. The disc guide 120 is coupled to the seat 126 such that the seat 126 acts as a datum (e.g., zero point, resting point, etc.) for the disc guide 120.

The geometry of the interface between the cap 116 and the disc 118 (e.g., the first profile of the cap 116 and the second profile of the disc 118) compensates for misalignment by enabling the surface of the armature plunger 108, at the interface of the armature plunger 108 and the cap 116, and the surface of a seat 126, at the interface between the disc 118 and the seat 126, to be non-parallel and to still effectuate the desired seal. The armature plunger 108 defines a third center 109. The radial translation enables the sealing of a pressurized fuel from the low-pressure drain circuit in the closed position via the interface between the cap 116 and the disc 118, when the centerline of the armature plunger 108 (e.g., the third center 109) and the seat 126 (e.g., the second center 127) are not co-axial (e.g., nonconcentric). Ineffective dissipation of kinetic energy of moving elements in a fuel injector assembly may result in poor closely-coupled multi-pulse injection events and radial and angular misalignment. The configuration of the cap 116 and the disc 118 enable the disc 118 to form the sealing interface with the seat 126 while compensating for both radial and angular misalignment relative to the sealing surface of the seat 126. Additionally, the configuration of the cap 116 and the disc 118 act to dissipate kinetic energy between the surfaces of the cap and the other moving elements in the fuel injector assembly 100, which also have radial and angular alignment relative to the sealing surface of the seat 126.

Due to the longitudinal translation of the components of the fuel injector assembly 100 during the injection event, the armature assembly 106 may not be radially aligned (e.g., not being concentrically aligned on the longitudinal axis l) when the armature assembly 106 returns to the closed position. This may also cause the armature assembly 106 to be angularly misaligned (e.g., to define an angle relative to radial axis r). In a fuel injector assembly configuration without the cap 116, the disc 118 and the disc guide 120, misalignment of the armature assembly 106 would cause high-pressure fuel to leak at the seat 126. As discussed in greater detail above, the cap 116, the disc 118, and the disc guide 120 compensate for the radial and angular misalignment, which may result in improved sealing capabilities by the fuel injector assembly 100.

The fuel injector assembly 100 further includes a biasing member, e.g., an overtravel biasing member 128 (e.g., a coil spring which serves as a compensation spring, etc.). The overtravel biasing member 128 is positioned around the armature 114. As discussed in greater detail herein, the overtravel biasing member 128 acts to bias the armature 114 to make axial contact against a surface of the armature plunger 108. Additionally, the overtravel biasing member 128 compensates for overtravel of the armature 114, when the armature assembly 106 longitudinally translates towards the seat 126.

The seat 126 further includes the flow passage 130 (e.g., injection bore, etc.). The flow passage 130 extends along the seat 126 parallel to the longitudinal axis l. In the closed position, the flow passage 130 is in confronting relation with the disc 118. The flow passage 130 contains high-pressure fuel of a fuel circuit. When the fuel injector assembly 100 transitions into the open position, high-pressure fuel from the flow passage 130 flows into the fuel cavity 112, as the fuel cavity 112 is at a draining pressure (e.g., a lower pressure, etc.). This pressure drop results in the flow passage 130 to initiate the injection event. The fuel cavity 112 is fluidly coupled to a low-pressure fuel drain circuit. The fuel cavity 112 is configured to receive the fuel flowing from the high-pressure region through the flow passage 130 via a flow path through the seat 126 and the disc 118. The flow path through the seat 126 and the disc 118 is unsealed (e.g., exposed, displayed, etc.) during the open position of the fuel injector assembly 100. The flow passage 130 may be a straight passage, an angled passage, or other similar passage.

The fuel injector assembly 100 further includes the fuel inlet 132 (e.g., intake, etc.). The fuel inlet 132 is fluidly coupled to the flow passage 130 and is configured to provide high-pressure fuel to the flow passage 130.

The fuel injector assembly 100 further includes a control chamber 134 (e.g., control cavity, etc.). The control chamber 134 is fluidly coupled to the fuel inlet 132. When the seal interface created by the seat 126 and the disc 118 is broken (e.g., the fuel injector assembly 100 transitions to the open position), the pressure in the control chamber 134 drops as fuel flows past the now-open sealing interface. When the seal interface created by the seat 126 and the disc 118 is resealed (e.g., the fuel injector assembly 100 transitions back to the closed position), pressure in the control chamber 134 begins to increase. The control chamber 134 is fluidly coupled through an inlet orifice to a high-pressure injector and high-pressure system volumes (not shown).

The fuel injector assembly 100 further includes a lower plunger 136 (e.g., piston rod, etc.). The lower plunger 136 is coupled to the control chamber 134 and to the combustion chamber. The lower plunger 136 maintains the fuel injector assembly 100 in the closed position (e.g., a non-injection state, etc.). The dropping of the pressure of the control chamber 134 may reduce the magnitude of the pressure forces acting on the lower plunger. When the lower plunger 136 is opened, the fuel injector assembly 100 transitions into the open position (e.g., an injection state, etc.) The high-pressure fuel from the control chamber 134 is provided to the combustion chamber. This initiates the injection event caused by the fuel injector assembly 100 which injects the high-pressure fuel into the combustion chamber.

An injection event is initiated when the net forces acting on the lower plunger 136, which had previously been acting to seal the high pressure fuel in the fuel injector assembly 100 from flowing into the combustion chamber, drops to enable flow past the previously closed interface. An injection event is terminated by de-energizing the stator 104. The electromagnetic force on the armature 114 is reduced, and the force from the primary biasing member 110 acts to close the interface between the disc 118 and the seat 126. The pressure in the control chamber 134 increases, which acts to cause the lower plunger 136 to close against the nozzle sealing surface (not shown). This stops the control chamber 134 from providing the high-pressure fuel and ends the injection event to the combustion chamber.

Figure 2:
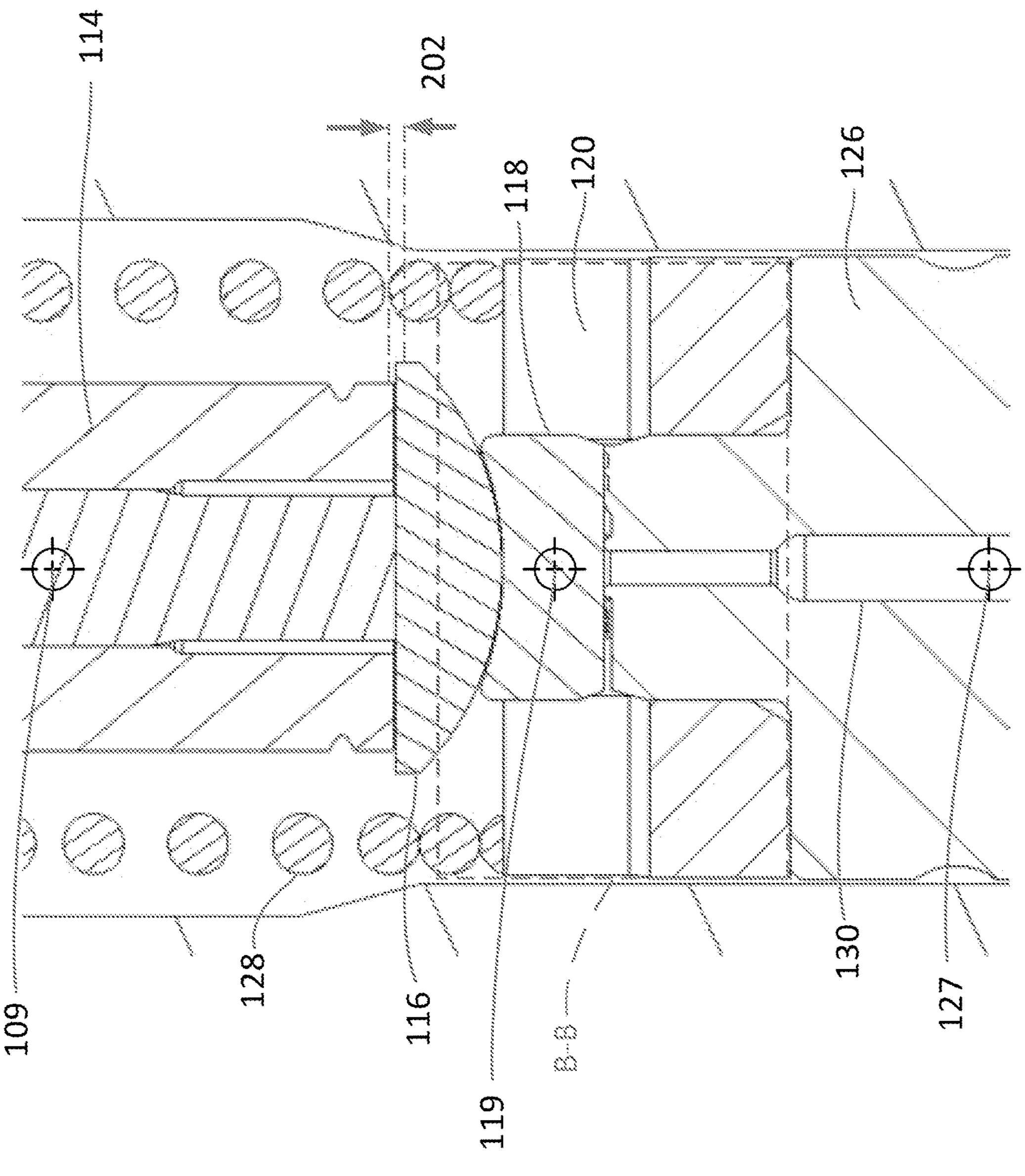
FIG. 2 is an enlarged view of the example fuel injector assembly of FIG. 1, from region A-A thereof.

FIG. 2 is an enlarged view of the example fuel injector assembly 100 of FIG. 1, from region A-A thereof, which illustrates an overtravel gap 202 between the armature 114 and the cap 116. After dispensing the desired amount of high-pressure fuel in the open position, the fuel injector assembly 100 returns to the closed position. When transitioning into the closed position, the armature 114 is able to continue translating longitudinally towards a second surface, e.g., a top surface of the cap 116. As the armature 114 approaches the top surface of the cap 116, the pressure of the fuel between the armature 114 and the top surface of the cap 116 increases as a result of squeeze film forces. This increase in pressure decelerates the velocity of the armature 114 in conjunction with other forces in the fuel injector assembly 100 (e.g., forces provided by the overtravel biasing member 128, residual electro-magnetic forces acting on the armature 114, and pressure forces acting on the armature 114, etc.). The axial distance between a proximate surface of the armature 114 (e.g., an end surface of the armature 114) and a proximate surface of the cap 116 (e.g., the top surface of the cap 116) defines the overtravel gap 202. The proximate surface of the armature 114 is axially opposed to the proximate surface of the cap 116. The overtravel biasing member 128 applies a biasing force onto the armature 114, and the first center 119 and the third center 109 become concentric within the overtravel gap 202. This configuration may reduce the net forces and stresses on the armature assembly 106, the cap 116, the disc 118, and the seat 126, by effectively reducing the moving mass and stiffness of the armature assembly 106. This may be beneficial for the multi-pulse performance of the fuel injector assembly 100 by dissipating kinetic energy of the armature assembly 106, allowing the armature 114 to consistently return to the same position after each high-pressure fuel injection into the combustion chamber. The cap 116 is configured to rotate to compensate for the translation of the proximate surface of armature 114 at an angle relative to the proximate surface of cap 116.

The angular misalignment interface mechanism between the disc 118 and the cap 116 enables the proximate surface of the cap 116 to adjust to a more parallel relationship with the proximate surface of the armature 114 just across the overtravel gap 202. The radial misalignment interface mechanism between both the disc 118 and the cap 116 and the disc 118 and the disc guide 120 acts to restrict the radial motion of the cap 116 relative to the surface of the armature 114 just across the overtravel gap 202.

Figure 3:
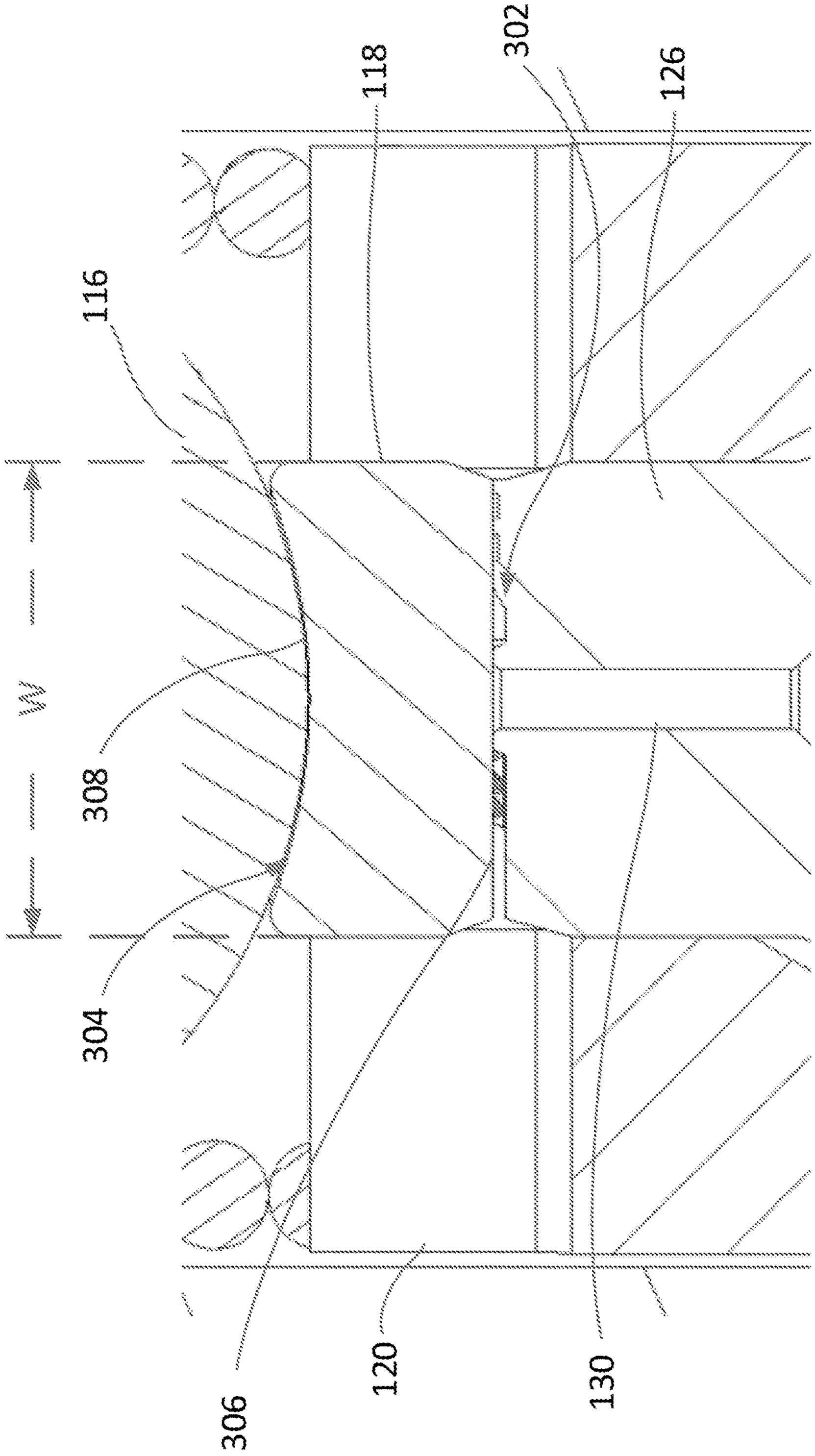
FIG. 3 is an enlarged view of the example fuel injector assembly of FIG. 2, from region B-B thereof.

FIG. 3 is an enlarged view of the example fuel injector assembly 100 of FIG. 2, from region B-B thereof, which illustrates a seat profile 302 (e.g., outline, feature, etc.). The seat profile 302 is integrated (e.g., embedded, stamped, fastened, etc.) onto the face of the seat 126 where the sealing interface is made (e.g., between the seat 126 and the disc 118). As discussed below in reference to FIG. 4, the seat profile 302 includes raised features, such as a taper and/or a convex surfaces positioned radially to an inlet of the flow passage 130.

FIG. 3 further illustrates a first surface 304 and a second surface 306 of the disc 118. The disc 118 also includes a width W (e.g., diameter) of the disc 118. The first surface 304 of the disc 118 is axially opposed to the second surface 306 of the disc 118. The first surface 304 of the disc 118 is a curved surface which defines a radius of curvature 308. The radius of curvature 308 is relatively large when compared to the value of the width W, such that the absolute value of the radius of curvature for the first surface 304 of the disc 118 may be greater than value of the width W (e.g., radial diameter) of the disc 118. The first surface 304 of the disc 118 is proximate to the cap 116 and may be in confronting relationship with a first surface, e.g., a bottom surface of the cap 116, where the bottom surface of the cap 116 is axially opposed to the top surface of the cap 116. In the closed position, the bottom surface of the cap 116 receives the first surface 304 of the disc 118 and the first surface 304 of the disc 118 receives the bottom surface of the cap 116. The relatively large radius of curvature 308 may be advantageous as it can improve the durability of the interface between the cap 116 and the disc 118 (e.g., a raised interface) by reducing the damage and deformation at the interface. This may be beneficial as it minimizes (e.g., reduces, mitigates, etc.) a stroke shift of the moving elements relative to the sealing surface of the seat 126 along the longitudinal axis l. This configuration also has the benefit of reducing wear at the interface between the cap 116 and the disc 118 as a result of the cap 116 rolling relative to the disc 118, rather than sliding, during angular misalignment compensation. The second surface 306 of the disc 118 is a flat surface (e.g., has a generally flat profile). In the closed position, the second surface 306 of the disc 118 is in confronting relationship with a surface of the seat 126. In the open position, the seat 126 is positioned distally from the second surface 306 of the disc 118, defining the flow path between the disc 118 and the seat 126.

Figure 4:
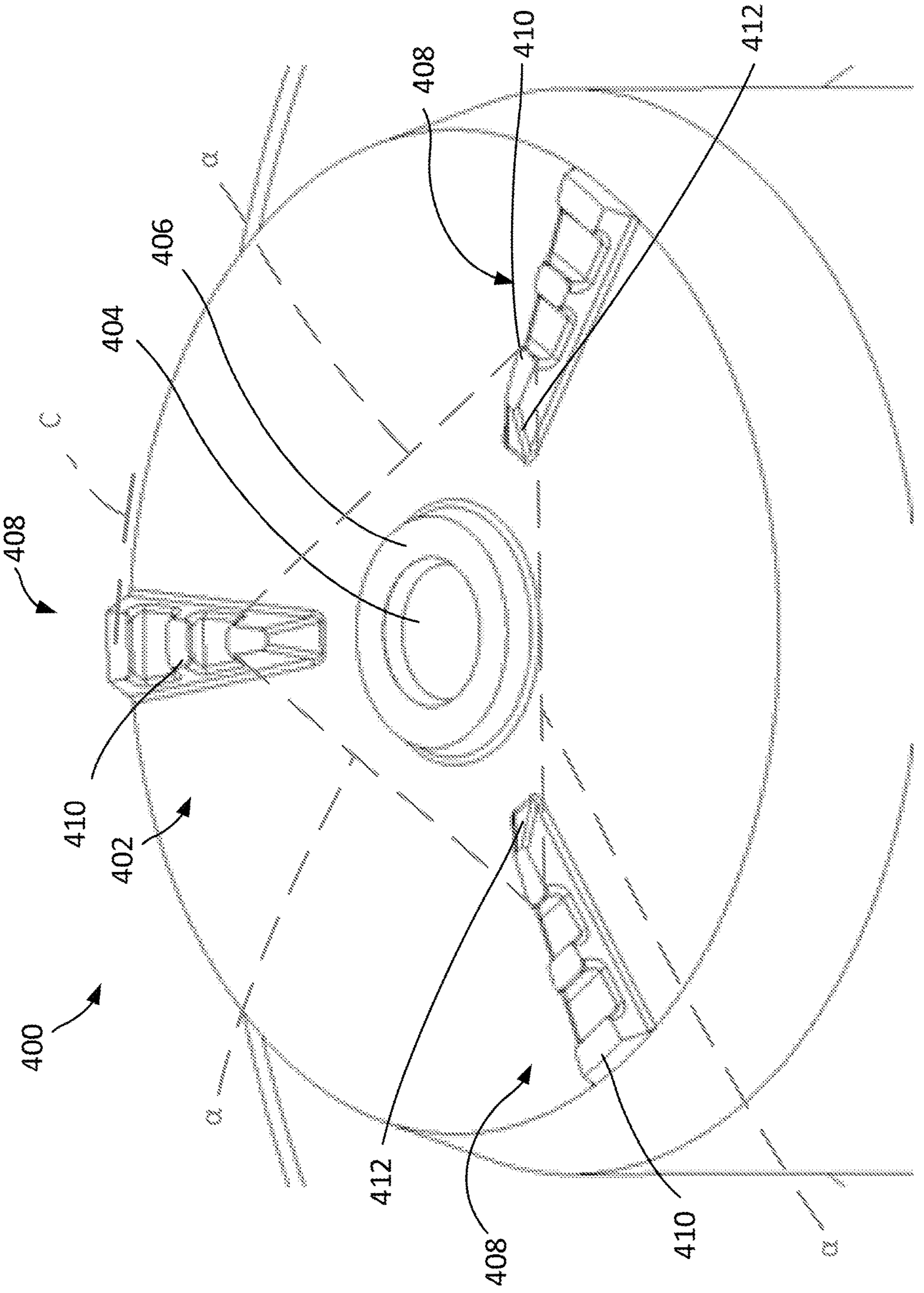
FIG. 4 is a perspective view of an example seat for use in the fuel injector assembly of FIG. 1.

FIG. 4 is a perspective view of a seat 400 (such as the seat 126) for a fuel injector assembly (e.g., such as the fuel injector assembly 100) with select components omitted. The seat 400 includes a seat profile 402 (such as the seat profile 302). The seat profile 402 includes an inlet or a fuel inlet, e.g., a central inlet 404 (e.g., opening, aperture, etc.). The central inlet 404 is fluidly coupled to an injecting bore (such as flow passage 130) and is configured to receive fuel in the open position. The seat profile 402 may be coated to improve its durability.

The seat profile 402 further includes a raised perimeter 406 (e.g., border, circumference, etc.). The raised perimeter 406 is a raised surface relative to the central inlet 404 and encompasses the central inlet 404. The raised perimeter 406 increases the contact pressure between a disc (such as disc 118) and the seat 400. This contact pressure can improve the sealing capabilities and the peak pressure capacity of the sealing interface. In various embodiments, the surface of the raised perimeter 406 may be flat or maybe be of a geometry such that the contact pressure at the radially inner surface regions of the raised perimeter 406 is greater than at the radially more outward surfaces in order to promote improved sealing performance.

The seat profile 402 further includes a plurality of raised features 408 (e.g., protrusions, step-ups, bosses, etc.). The plurality of raised features 408 are positioned radial to the raised perimeter 406 and extend to an outside perimeter of the seat profile 402. The raised perimeter 406 defines a first height and the plurality of raised features 408 defines a second height. In some embodiments, the first height is longer than the second height. In other embodiments, the second height is longer than the first height. The plurality of raised features 408 are configured to interface with a disc (e.g., such as the disc 118 of FIG. 1). This configuration results in the plurality of raised features 408 to compensate for any angular misalignment of the disc 118 (e.g., translation of the disc 118 at an angle), during the axial translation of an armature assembly (e.g., such as the armature assembly 106) towards the seat 400 and provides protection to the raised perimeter 406. The plurality of raised features 408 define a plurality of theoretical lines $\alpha$, which connect each of the plurality of raised features 408. The plurality of theoretical lines $\alpha$ are positioned radially exterior to the raised perimeter 406. Due to this increased radial distance, the raised perimeter 406 and the plurality of raised features 408 may have improved durability during the angular misalignment of the disc 118. The increased radial distance also results in a reduction of coating loss on the seat profile 402 from delamination and wear.

Each of the plurality of raised features 408 include a plurality of raised sections, e.g., a plurality of raised pads 410 (e.g., subsections, etc.). The plurality of raised pads 410 are arranged such that, depending upon the particular embodiment, each pad is raised, lowered or neutral relative to the prior pad, as the plurality of raised pads 410 radially extend away from the central inlet 404 (e.g., each pad respectively protrudes taller, is shorter, or are the same height along the length of each of the plurality of raised features 408). In example embodiments, the plurality of raised pads 410 are further arranged to increase in width, in a transverse axis, as the plurality of raised pads 410 radially extend away from the central inlet 404. The surfaces of the raised features 408 may be co-planar with or may be slightly recessed below the upper surfaces of raised perimeter 406 in order to promote improved sealing performance. The upper surfaces of the plurality of raised pads 410 may be flat or may be tapered (e.g., as described in greater detail above). This configuration minimizes the magnitude of the potential bearing area relative to, and opposed to, the disc 118 in order to prevent negativity affecting the sealing performance. In other words, in order to promote improved sealing performance, the surface area of the upper surfaces of the raised features 408 may also be minimized. In example embodiments, the plurality of raised pads 410 includes three raised pads.

When a disc having angular misalignment relative to the seat 400 begins to longitudinally translate towards the seat 400, the disc will first make contact with one of the plurality of raised pads 410. The disc will then begin to roll (e.g., begin to align itself to be parallel) to the seat 400 before resting on the seat 400. By rolling, the impact force by the disc decreases. When the disc is also in confronting relation with a cap having a spherical surface (e.g., cap 116), the disc is able to roll with less effort when pressed by the spherical surface. This initial contact with the plurality of raised pads 410 may improve the durability of the sealing surfaces of the raised perimeter 406.

Each of the plurality of raised features 408 defines an inner angled surface 412 (e.g., contact surface, etc.). The inner angled surface 412 is angled relative to the longitudinal axis l and positioned most radially inward of the plurality of raised features 408 (e.g., closest to the raised perimeter 406). At times, high-pressure fuel may contain hard debris (e.g., detritus, particulates, etc.). Due to the high pressure of the fuel, hard debris in the fuel will have a high velocity. If the hard debris leaves the flow path of the high-pressure fuel at an interface, it can cause erosive damage. The inner angled surface 412 is configured such that if debris were to exit the interface between the seat 400 and the disc, it would first make contact with the inner angled surface 412. The angle of the inner angled surface 412 alters the angle of incidence of impact of the hard debris, reducing the amount of erosion onto the seat 400.

In some embodiments, the width of the raised pads 410 increases in a direction C circumferential relative to the raised perimeter 406, as one approaches the outer circumference away from the central inlet 404, i.e., the raised pads 410 furthest from the central inlet 404 are wider relative to the raised pads 410 closest to the central inlet 404. This configuration defines a wedge shape. In some embodiments, the width of the raised pads 410 increases in a direction tangential to the circumference relative to the raised perimeter 406. The plurality of raised pads 410 nearest the central inlet 404 creates a shield against the hard debris protecting the plurality of raised pads 410 furthest from the central inlet 404. This may be advantageous as the plurality of raised pads 410 furthest from the central inlet 404 are more likely to make contact with misaligned discs during translation of the disc. This may be beneficial as it can increase the durability and robustness of the seat 400 against hard debris.

Figure 5:
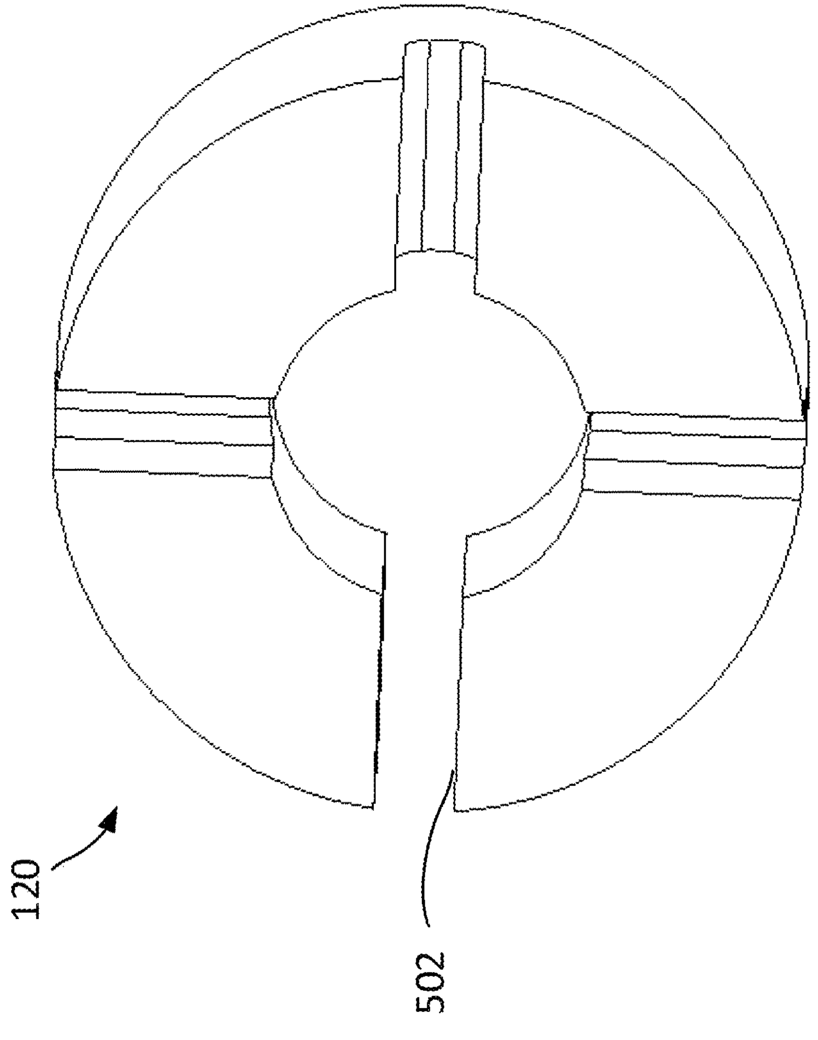
FIG. 5 is a perspective view of an example disk guide for use in the fuel injector assembly of FIG. 1.

FIG. 5 is a perspective view of a disc guide 120 for use in the fuel injector assembly 100 of FIG. 1. As discussed in greater detail above, during an injection event for the fuel injector assembly 100, various components, including the disc 118, longitudinally translate. The disc guide 120 provides radial guidance to the disc 118 during this translation. The disc guide 120 is designed to provide radial clearance to the disc 118 while also allowing the disc 118 to seal high-pressure fuel. This radial clearance allows for the disc 118 to compensate for radial and/or angular misalignment of the other components in the fuel injector assembly 100. Compensation for radial and/or angular misalignment may result in improved sealing performance at a sealing interface for the high-pressure fuel between the seat 126 and the disc 118.

The disc guide 120 includes a slot 502 (e.g., space, aperture, etc.). The slot 502 enables the disc guide 120 to be installed onto the seat 126 during assembly with ease and without requiring tightly tolerance components (e.g., such as the disc 118, the disc guide 120, the seat 126, etc.). This may beneficial as it can reduce the stiffness of components caused during the assembly process.

Figure 6:
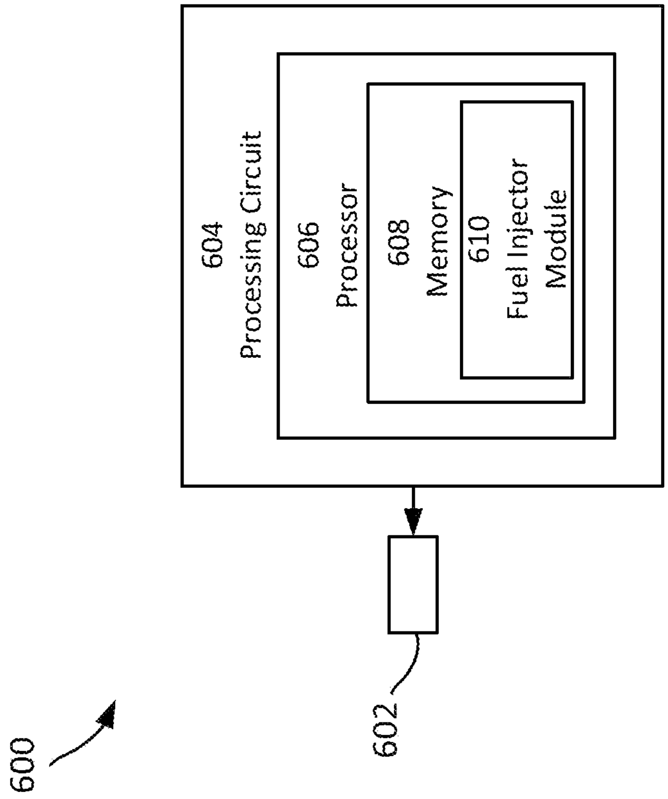
FIG. 6 is a block schematic of an example controller for use in the fuel injector assembly of FIG. 1.
Figure 7:
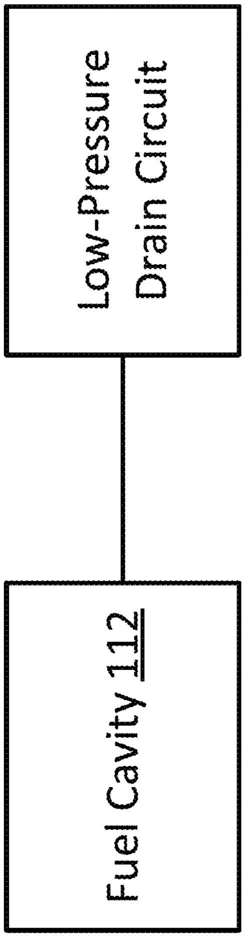
FIG. 7 is a block schematic of a fuel cavity and a low-pressure drain circuit for use in the fuel injector assembly of FIG. 1.
Figure 8:
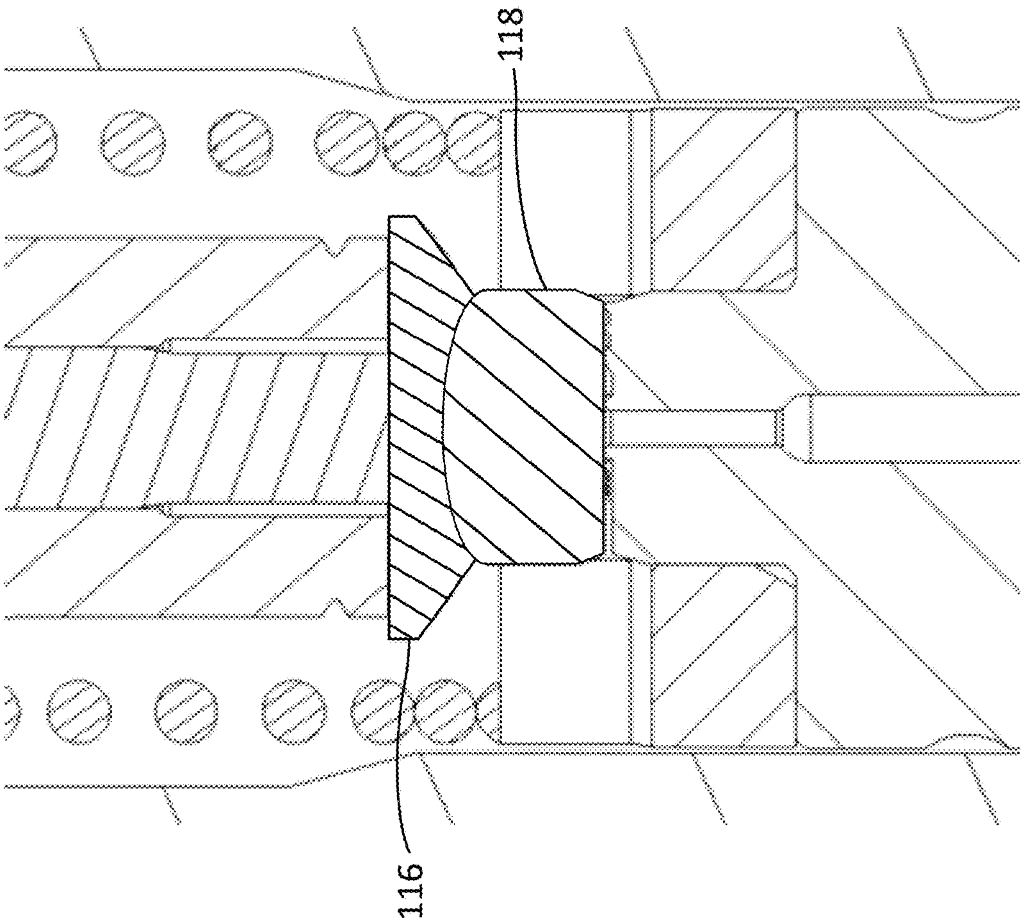
FIG. 8 is another enlarged view of the example fuel injector assembly of FIG. 1, from region A-A thereof.

FIG. 6 is a block schematic of an example controller 600 for use in a fuel injector assembly (such as fuel injector assembly 100). The controller 600 may be integrated into an engine control unit (ECU) for an engine utilizing the fuel injector assembly. In some embodiments, the controller 600 is a separate system to the ECU. The fuel injector assembly is electrically or communicatively coupled to the controller 600. The controller 600 may be configured to provide an electronic signal to the fuel injector assembly to control when to initiate or to stop an injection event. In these embodiments, the controller 600 provides a control signal 602 to the fuel injector assembly to start or stop the injection event into a combustion chamber.

The controller 600 also includes a processing circuit 604. The processing circuit 604 includes a processor 606 and a memory 608. The processor 606 may include a microprocessor, an application-specific integrated circuit (ASIC), a field-programmable gate array (FPGA), etc., or combinations thereof. The memory 608 may include, but is not limited to, electronic, optical, magnetic, or any other storage or transmission device capable of providing a processor, ASIC, FPGA, etc. with program instructions. This memory 608 may include a memory chip, electrically erasable programmable read-only memory (EEPROM), erasable programmable read only memory (EPROM), flash memory, or any other suitable memory from which the controller 600 can read instructions. The instructions may include code from any suitable programming language. The memory 608 may include various modules that include instructions which are configured to be implemented by the processor 606.

The memory 608 includes a fuel injector module 610 (e.g., circuit). The fuel injector module 610 is configured to facilitate interaction between the controller 600 and the fuel injection assembly. The fuel injector module 610 provides the control signal 602 to the fuel injector assembly based on the fueling needs of the engine.

III. Overview of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A fuel injector assembly comprising:

a member having a first center along a longitudinal axis, the member comprising:

a curved surface having a radius of curvature, the radius of curvature of the curved surface being greater than a width of the member, and a flat surface axially opposed to the curved surface; and a seat having a second center disposed on the longitudinal axis, the seat being positioned distal from the flat surface defining a flow path in an open position of the fuel injector assembly, and in confronting relation to the flat surface such that the second center is concentric to the first center forming a sealing interface in a closed position of the fuel injector assembly.

2. The fuel injector assembly of claim 1, further comprising a member guide configured to limit translation of the member in a radial direction.

3. The fuel injector assembly of claim 1, further comprising:

a stator defining a bore along the longitudinal axis; and an armature assembly configured to translate along the longitudinal axis, the armature assembly comprising an armature plunger positioned in the bore and a cap coupled to the armature plunger.

4. The fuel injector assembly of claim 3, wherein the member is in confronting relation to the cap, and wherein the cap defines a first profile and the member defines a second profile, the first profile configured to receive the second profile and the second profile configured to receive the first profile when the first profile receives the second profile.

5. The fuel injector assembly of claim 4, wherein the first profile comprises a convex profile and the second profile comprises a concave profile.

6. The fuel injector assembly of claim 4, wherein the first profile comprises a concave profile and the second profile comprises a convex profile.

7. The fuel injector assembly of claim 4, wherein the first profile is configured to allow the cap to roll off of the second profile to compensate for translation of the member at an angle when the armature assembly longitudinally translates towards the seat.

8. The fuel injector assembly of claim 3, wherein the armature assembly further comprises:

an armature coupled to the armature plunger; and a biasing member positioned radially relative to the armature, the biasing member configured to compensate for overtravel of the armature when the armature assembly longitudinally translates towards the seat.

9. The fuel injector assembly of claim 3, further comprising a raised interface defined by a first surface of the member in confronting relationship with a first surface of the cap, the first surface of the cap receiving the first surface of the member and the first surface of the member receiving the first surface of the cap in the closed position, wherein the armature plunger has a third center, and wherein the raised interface seals a pressurized fuel from a low-pressure drain circuit in the closed position when the second center and the third center are non-concentric.

10. The fuel injector assembly of claim 9, wherein the armature assembly further comprises an armature positioned around an end of the armature plunger, wherein a biasing force is applied upon the armature as the fuel injector assembly transitions to the closed position, and wherein the first center and the third center become concentric within an overtravel gap when as the fuel injector assembly transitions to the closed position, the overtravel gap being an axial distance between an end surface of the armature and a second surface of the cap, the second surface of the cap being axially opposed to the first surface of the cap.

11. The fuel injector assembly of claim 1, wherein the seat comprises:

an inlet configured to receive fuel in the open position; and a raised perimeter around the inlet.

12. The fuel injector assembly of claim 11, wherein the seat further comprises a plurality of raised features positioned radially away from the raised perimeter, the plurality of raised features are configured to interface with the member to compensate for translation of the member at an angle, each of the plurality of raised features comprising an angled surface relative to the longitudinal axis and a plurality of raised sections.

13. The fuel injector assembly of claim 12, wherein the plurality of raised sections comprises three raised sections.

14. The fuel injector assembly of claim 12, wherein the raised perimeter defines a first height and the plurality of raised features defines a second height, the first height exceeding the second height.

15. The fuel injector assembly of claim 12, wherein the raised perimeter defines a first height and the plurality of raised features defines a second height, the second height exceeding the first height.

* * * * *